United States Patent
Siegel et al.

(10) Patent No.: US 9,446,453 B2
(45) Date of Patent: Sep. 20, 2016

(54) DRIVE CENTER WITH GUARD

(71) Applicant: BIG TREE TOOLS, LLC, Wilmot, NH (US)

(72) Inventors: Jon Siegel, Wilmot, NH (US); Grinnell More, Nashua, NH (US)

(73) Assignee: Big Tree Tools, LLC, Wilmot, NH (US)

( * ) Notice: Subject to any disclaimer, the term of this patent is extended or adjusted under 35 U.S.C. 154(b) by 477 days.

(21) Appl. No.: 13/934,357

(22) Filed: Jul. 3, 2013

(65) Prior Publication Data
US 2015/0007701 A1    Jan. 8, 2015

(51) Int. Cl.
B23B 23/02    (2006.01)
B23B 23/04    (2006.01)
B23B 33/00    (2006.01)

(52) U.S. Cl.
CPC .............. *B23B 33/005* (2013.01); *B23B 23/02* (2013.01); *B23B 23/04* (2013.01); *B23B 23/045* (2013.01); *B23B 2233/24* (2013.01); *B23B 2233/32* (2013.01); *Y10T 82/2568* (2015.01)

(58) Field of Classification Search
CPC .................... B23B 2260/136; B23B 2233/24; B23B 2233/28; B23B 2233/32; B23B 33/005; B23B 23/04; B23B 23/045; B23B 23/02
USPC .......... 82/148, 150, 165, 170, 164; 409/231, 409/242; 142/53
See application file for complete search history.

(56) References Cited

U.S. PATENT DOCUMENTS

| | | | | |
|---|---|---|---|---|
| 314,482 | A * | 3/1885 | Salomo | B23B 23/02 142/53 |
| 1,239,027 | A * | 9/1917 | Mentzer | B23B 23/02 142/53 |
| 2,377,594 | A * | 6/1945 | Weberg | B23B 23/02 407/10 |
| 2,725,777 | A * | 12/1955 | Benson | B23B 23/02 384/420 |
| 3,071,996 | A | 1/1963 | Rohm | |
| 3,143,907 | A * | 8/1964 | Ulrich | B23B 33/005 82/165 |
| 3,266,349 | A * | 8/1966 | Lane | B23B 33/005 82/165 |
| 3,311,006 | A * | 3/1967 | Seitter | B23B 33/005 82/165 |

(Continued)

FOREIGN PATENT DOCUMENTS

DE    3613410 A1 * 12/1986    ............. B23B 23/02
JP    03287304 A  * 12/1991

*Primary Examiner* — Sara Addisu
(74) *Attorney, Agent, or Firm* — Davis & Bujold PLLC; Michael J. Bujold

(57) ABSTRACT

A drive center constituting a machine tool accessory being used on a lathe for holding workpieces that are mounted between the headstock and the tailstock (between centers). The drive center includes a head having an adjustable spring-loaded center point and a number of removable, adjustable spurs that are capable of penetrating a workpiece sufficiently to provide torque for the turning process. The head is attached to a shank with a standard taper to fit the spindle of a lathe. A cylindrical guard is supported coaxially by the external surface of the head so that the guard radially encircles the head and the spurs but is able to slide axially and rotationally with respect to the head. A spring causes the guard to extend axially beyond the spurs except when pushed back by the workpiece.

19 Claims, 7 Drawing Sheets

(56) References Cited

U.S. PATENT DOCUMENTS

| | | | |
|---|---|---|---|
| 3,518,904 A | 7/1970 | Rohm | |
| 3,610,077 A * | 10/1971 | Staplemann | B23B 23/04 29/525 |
| 4,125,042 A * | 11/1978 | Barron | B23B 33/005 82/151 |
| 4,370,907 A * | 2/1983 | Felice | B23B 23/02 82/150 |
| 4,398,579 A * | 8/1983 | Holdahl | B23B 23/02 142/53 |
| 4,604,923 A * | 8/1986 | Link | B23B 3/161 279/133 |
| 4,667,549 A * | 5/1987 | Griffin | B23B 23/04 142/53 |
| 4,677,885 A | 7/1987 | Schmid et al. | |
| 5,000,068 A * | 3/1991 | Knabel | B23B 23/02 82/148 |
| 5,243,885 A | 9/1993 | Lash | |
| 5,373,760 A * | 12/1994 | Schmidt | B23B 23/04 142/53 |
| 5,527,400 A * | 6/1996 | Smith | B23B 23/02 148/537 |
| 5,720,208 A | 2/1998 | Siegel | |
| 5,771,762 A * | 6/1998 | Bissett | B23B 31/261 142/53 |
| 6,374,713 B1 * | 4/2002 | Bissett | B23B 33/005 82/150 |
| 8,621,965 B2 * | 1/2014 | Scheu | B23B 33/005 82/165 |

\* cited by examiner

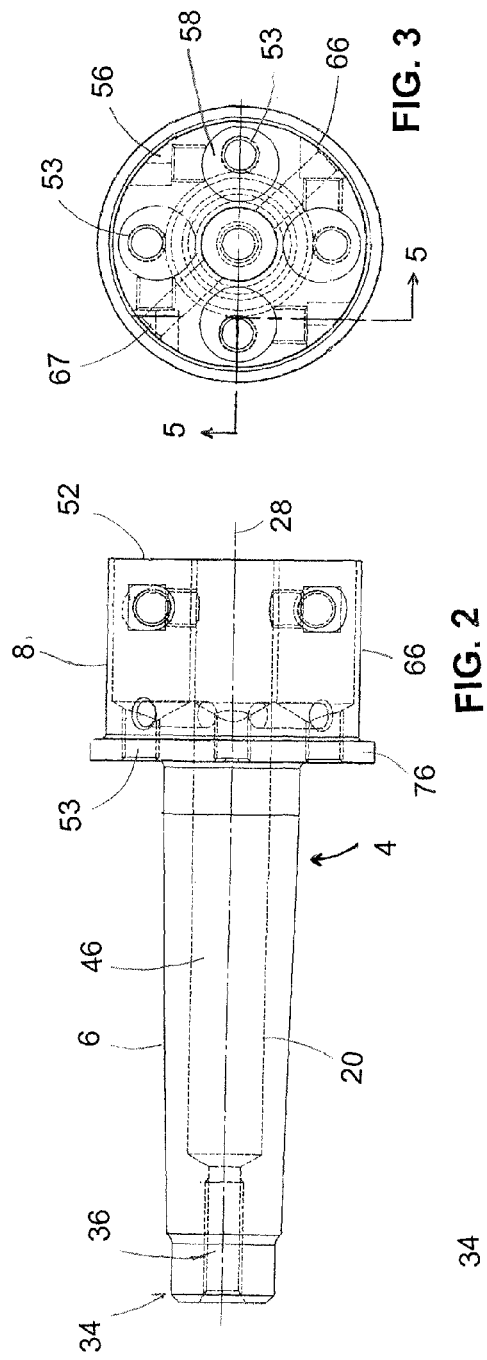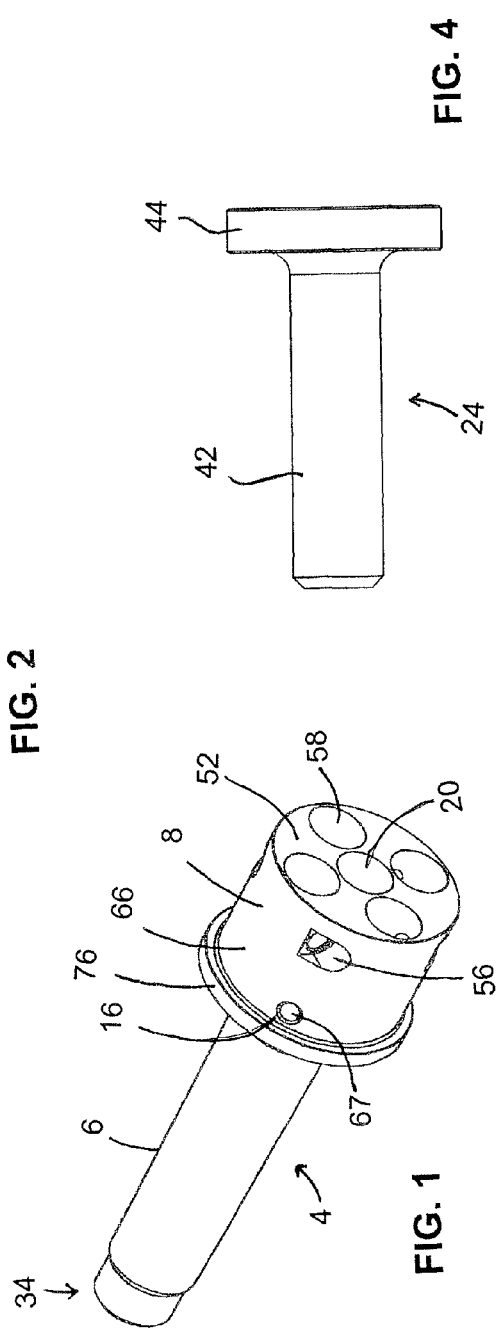

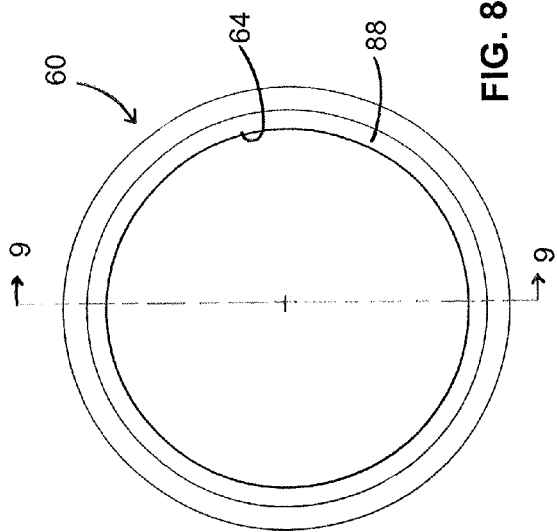
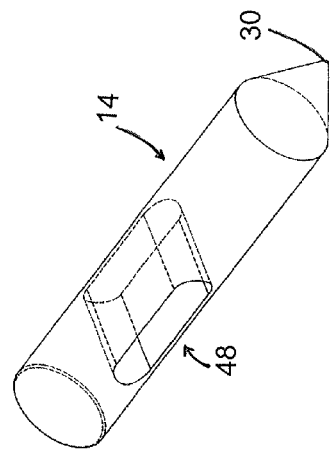
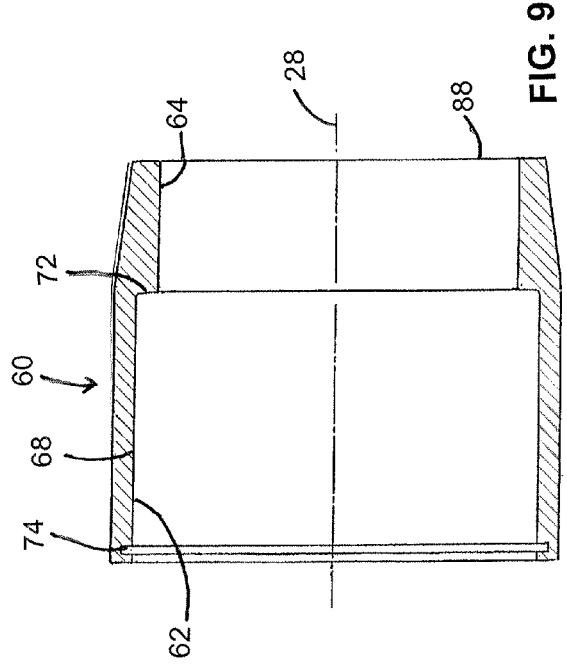
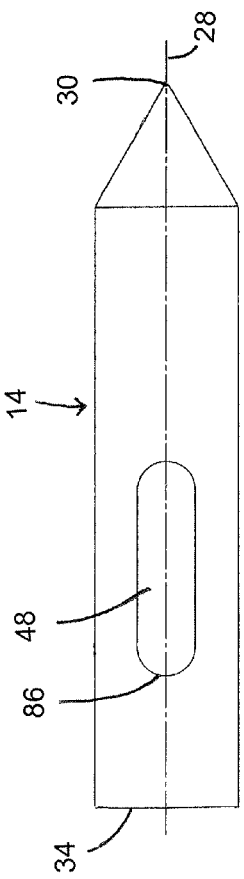

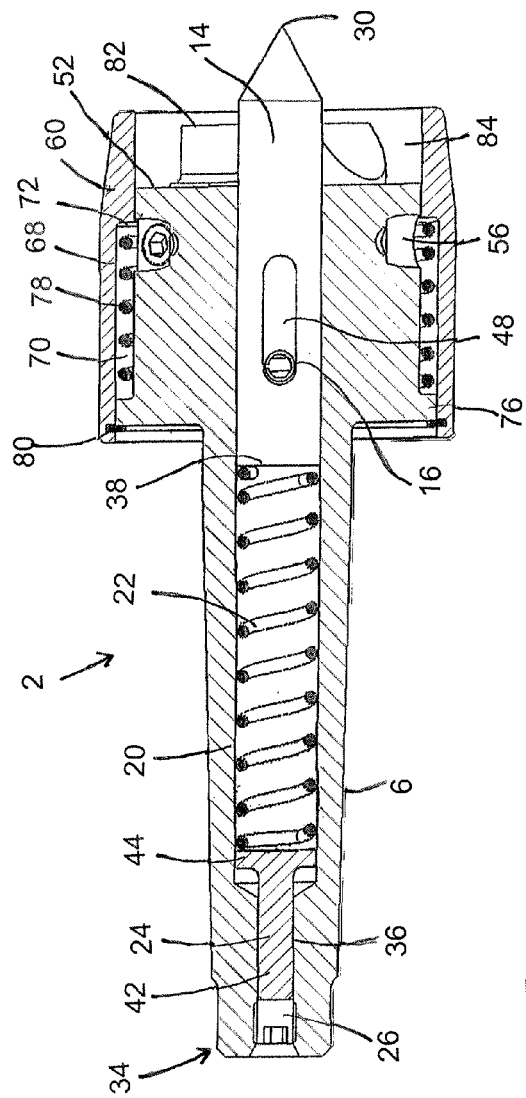
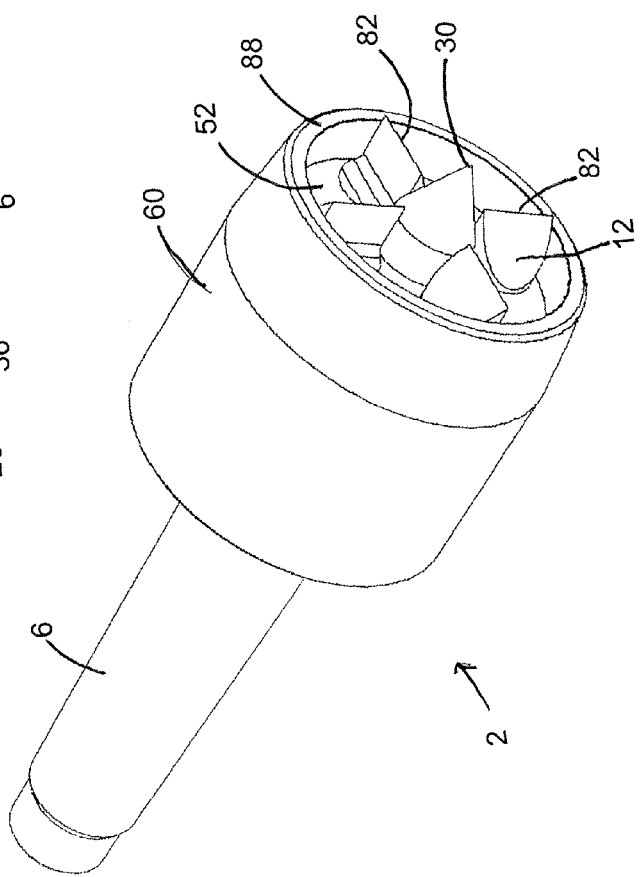
FIG. 11
FIG. 10

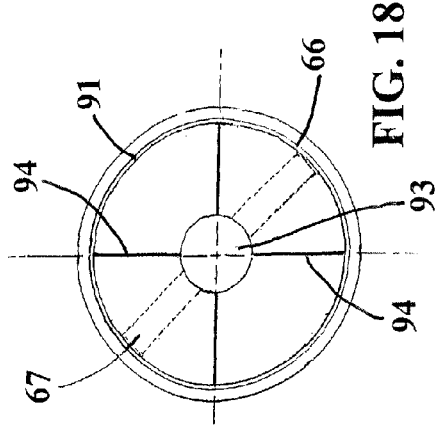
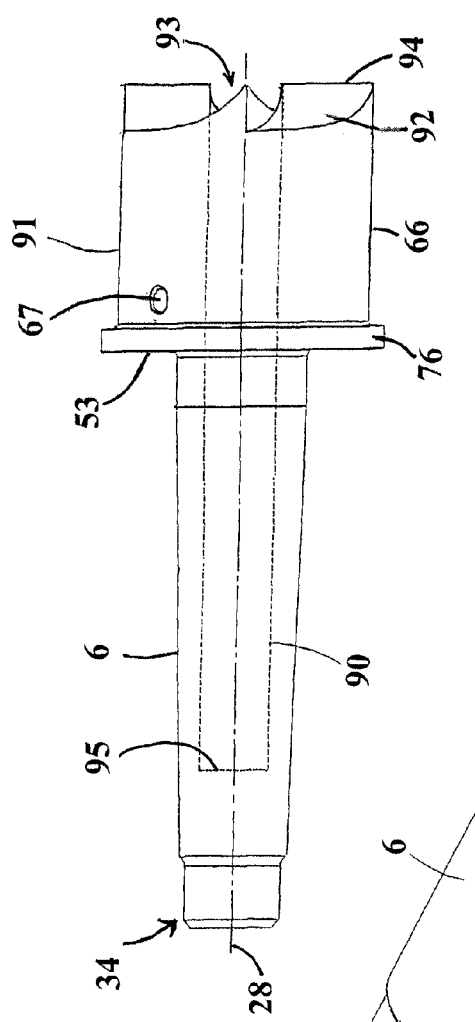
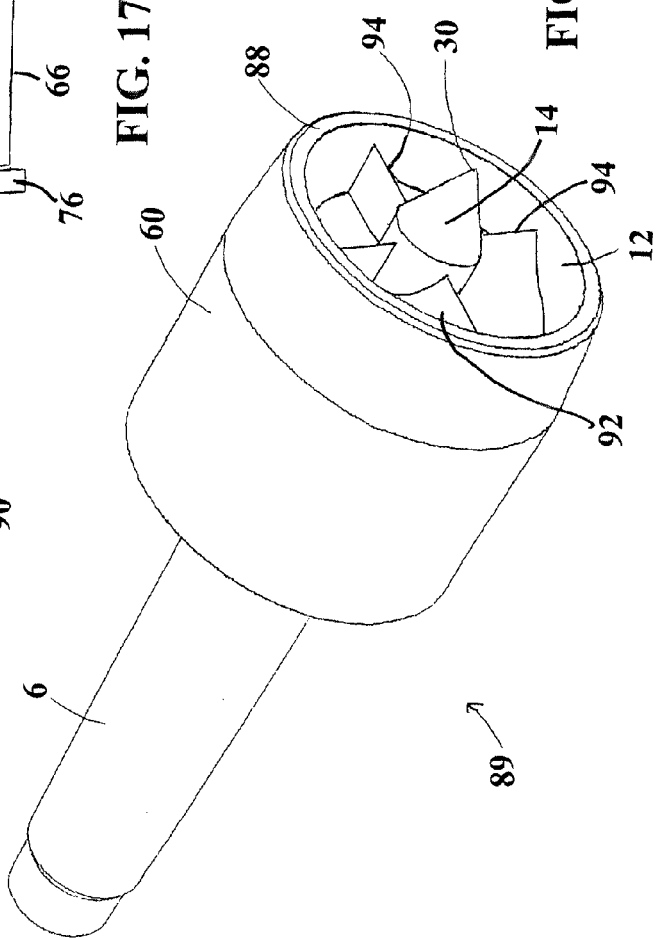

DRIVE CENTER WITH GUARD

FIELD OF THE INVENTION

The present invention relates to an apparatus for holding a workpiece as the workpiece rotates in a lathe and, more specifically, to a highly adjustable drive center equipped with a safety guard.

BACKGROUND OF THE INVENTION

Holding devices used in conjunction with lathes for mounting a workpiece between the headstock and tailstock of the lathe, are typically called drive centers, spur centers, or prong centers. These devices are intended to serve both the function of accurately locating the workpiece and rotating the workpiece (i.e., driving it), such that the device maintains correct centering and continued rotation as the operator applies torque on the workpiece by means of cutting tools.

Typical drive centers have a tapered shank that is received by an identically tapered bore in the spindle of the headstock of the lathe. Drive centers have a center point and a number of spurs or prongs. The spurs embed and engage in the workpiece and are retained there by the force imparted to the workpiece from the tailstock at the opposite end of the workpiece.

The workpiece is brought into its correct location against the drive center by placing the center point into a previously made indentation in the workpiece. The tailstock center is similarly engaged in the opposite end of the workpiece. After placing the workpiece between the lathe centers, the tailstock center is advanced toward the headstock so that the workpiece is sufficiently forced against the spurs of the drive center for holding and driving the workpiece. This process is referred to as "mounting" the workpiece on the lathe.

There are a number of drawbacks associated with known drive centers. One of the encountered problems stems from the fact that the density of the material of different workpieces can vary greatly. Due to this, different lengths of center points are required to effectively position the different workpieces. It is generally desirable to use a long center point for working with materials of low density, e.g., soft wood, and a short center point for working with materials of high density, e.g., hardwood. If the material is very dense, it is difficult to force the center point far enough into the workpiece so that the spurs will sufficiently engage with the workpiece. In this case, spurs are unable to impart the required torque and tend to slip against the workpiece. Many turners mistakenly attempt to compensate for this drawback by over-tightening the tailstock so as to increase the amount of force between the headstock and the tailstock. However, it is to be appreciated that a spindle should be turned with a minimum amount of force from the tailstock. The minimum force is defined herein as that force which is just enough to keep the work from slipping. It is known that the increase of force, between the centers, creates an excessive load on the headstock bearings and revolving center which results in premature wear and possible failure of the lathe. Further, the workpiece tends to deflect or flex from the centerline when it is "squeezed" too tightly by the centers. This flexing, sometimes called "whip," leads to vibration of the workpiece and causes the chisel to "chatter" which creates marks on the workpiece which are undesirable and difficult to repair.

When turning workpieces between centers, it is essential that the center point in the headstock spindle run true. If any of these components are eccentric, the workpiece will be eccentric about the rotational axis any time the workpiece is removed and replaced, or reversed end-for-end. Eccentricity may result from manufacturing tolerances of the center point, the shank of the drive center or the tapered bore of the spindle. The workpiece often becomes eccentric when it is removed from the lathe and then not accurately re-centered when it is again remounted on the lathe. To overcome eccentricity caused by manufacturing errors of the drive center and center point and the spindle, if the center point is rigidly coupled with the drive center, the drive center can be set into the spindle and the lathe turned on and with the spindle and drive center spinning, the center point can be trued-up so as to create a new axis. After this, the drive center must always be aligned in the spindle as it was when the new axis was created in the center point. In this way, the turner can achieve accuracy greater than that which was originally built into the lathe, but this remedy is only available if the center point is rotationally fixed in the body.

Truing-up the center point requires the center point to be rotationally fixed to the drive center, and other known drive centers in which the center point is not keyed, cannot be trued-up.

Although some of the known drive centers may have spring loaded center points and adjustable spurs, a major drawback of the known drive centers lies in the fact that the spurs are exposed, thus creating a safety hazard. It is possible for loose clothing, sleeves, neckties, jewelry or the hair of the turner, for example, to get caught or to become entangled in the spurs as the drive center rotates. Due to the high rate of rotation of the drive centers and the power imparted by the machine, when something becomes entangled with the spurs, this often results in serious injury to the turner. The turner could also inadvertently brush part of his/her body against the sharp spurs, whether the spindle is in motion or not in motion. Further, a collision between the tool rest or a chisel and the drive center can cause injury to the turner and damage to the spur center.

SUMMARY OF THE INVENTION

Wherefore, it is an object of the present invention to overcome the above-mentioned shortcomings and drawbacks associated with the prior art drive centers.

It is yet another objective of the present invention to provide a drive center that enables the workpiece to be removed or replaced or reversed end-for-end while the spindle and drive center are in motion. This allows for faster, safer, and convenient loading, unloading and/or reversing end-for-end of workpieces on the lathe. This feature is made possible because the center point is positioned by a spring that causes the point to maintain sufficient contact with the workpiece even as the force from the tailstock is removed, thus moving the workpiece away from the spurs, allowing the workpiece to stop rotating while maintaining its positional location between the headstock and tailstock centers. The functionality of the spring loaded center point is enhanced by two separate features of its design: first the length of travel (stroke) of the center point is nearly 10 mm, long enough to allow easy application of the left side of the workpiece to be mounted on the center point without any interference by the guard or the spurs; and second, the force on the spring is adjustable to conform and adapt to the weight, diameter, and rigidity of the workpiece.

It is still another objective of the present invention to ensure that when the workpiece is removed from the lathe and replaced or reversed end-for-end, it returns exactly to its original concentric position, and thus runs true on its original axis as previously.

A further objective of the present invention is to provide a spring loaded drive center that functions like a clutch so as to permit the workpiece to be easily stopped for measurement or inspection of the surface quality, such as during a sanding operation, without having to stop the spindle or motor.

Yet another objective of the present invention is to provide a drive center that is designed to allow the workpiece to be turned with the minimum of force from the tailstock. To accomplish this, the drive center, according to the invention, includes two pertinent features: First, the center point is provided with an adjustable spring that positions the point in a forward most orientation for initial location of the workpiece, but recedes out of the way as the workpiece is gradually advanced toward the spurs, thus causing minimal interference by the center point with the engagement of the spurs into the workpiece; and Second, the spurs are extremely sharp allowing them to embed and engage adequately with the workpiece and impart the necessary torque for the turning process.

Another objective of the present invention is to provide a drive center with spurs that can be quickly removed for resharpening, and following replacement, each of the spurs can be "micro adjusted" in the drive center so each of the spurs are the same length. Further, if a "two spur" center is desired, for roughing of cross grain bowls for example, two of the four spurs can be removed. The spurs of this drive center are also easily replaceable in the event that they become too short, from repeated sharpening, or possibly damaged by dropping or collision with another object.

A still further objective of the present invention is to provide a drive center having a guard which functions to enshroud or enclose the spurs thereby preventing objects, such as loose clothing, jewelry, or hair from inadvertently becoming entangled with the spurs, and preventing any part of the operator's body from coming into contact with the spurs. Because the guard itself is not rotationally fixed, it will stop rotating if the guard becomes entangled with clothing, jewelry, or hair.

The present invention also relates to a drive center for use with a lathe comprising a headstock and a tailstock. The drive center having a head that has a leading face and an exterior surface. The leading face of the head supports a plurality of spurs and a center point. A shank is integrally connected with a trailing end of the head and has a remote end that is spaced from the head. The center point, the shank, and the head define a rotational axis of the drive center. A cylindrical guard is coaxially supported by the exterior surface of the head such that the guard encases the head, and the guard is axially slidable along the exterior surface of the head between an extended position and a retracted position. A biasing element is supported by the head and biases the guard into the extended position in which a leading portion of the guard projects past the leading face of the head and the spurs but not the center point. The guard, when in the retracted position, encloses the spurs while still allowing engagement between the spurs and a workpiece.

The present invention also relates to a drive center for use with a lathe having a headstock and a tailstock. The drive center comprises a head that has a leading face and an external surface that has a flange located at an axial end of the head opposite from the leading face. The head supports a center point and at least two spurs which extend axially beyond the leading face of the head. A shank is fixed to a trailing end of the head that is axially opposite the leading face of the head. The shank and the head define a rotational axis of the drive center. A cylindrical guard is coaxially supported by the external surface of the head such that the guard radially encircles the head. The guard has a cylindrical inner surface that is directly supported on the external surface of the head and the flange such that the guard is rotationally and axially movable with respect to the head. The flange axially engages a retainer that is fixed to the guard so as to limit axial movement of the guard with respect to the head. The guard is in a fully extended position when the flange engages the retainer. A spring is radially located between the inner surface of the guard and the external surface of the head. The spring contacts the flange and the retainer so as to continually bias the guard axially toward the fully extended position in which the guard extends axially beyond the leading face of the head and the at least two spurs.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 1 is an isometric view of a drive center prior to the installation of a guard according to the invention;

FIG. 2 is a side view of the drive center of FIG. 1 prior to the installation of the guard with holes therein shown in dashed lines;

FIG. 3 is a front view of the drive center of FIG. 2 prior to the installation of the guard from a point of view on a rotational axis of the drive center according to the invention;

FIG. 4 is a side view of the spring pusher according to the invention;

FIG. 6 is an isometric view of a center point;

FIG. 7 is a side view of the center point of FIG. 6;

FIG. 8 is a front view of the guard, according to the present invention, prior to assembly on the head of the drive center;

FIG. 9 is a cross sectional side view of the guard along section line 9-9 shown in FIG. 8;

FIG. 10 is an isometric view of the drive center according to the invention following installation of the guard on the head;

FIG. 11 is a diagrammatic cross sectional side view of FIG. 10;

FIG. 17 is a side view of a further embodiment of the drive center according to the invention;

FIG. 18 is a front view of the embodiment of the drive center illustrated in FIG. 17; and FIG. 19 is a pictorial view of the embodiment of the drive center illustrated in FIG. 17.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 16:
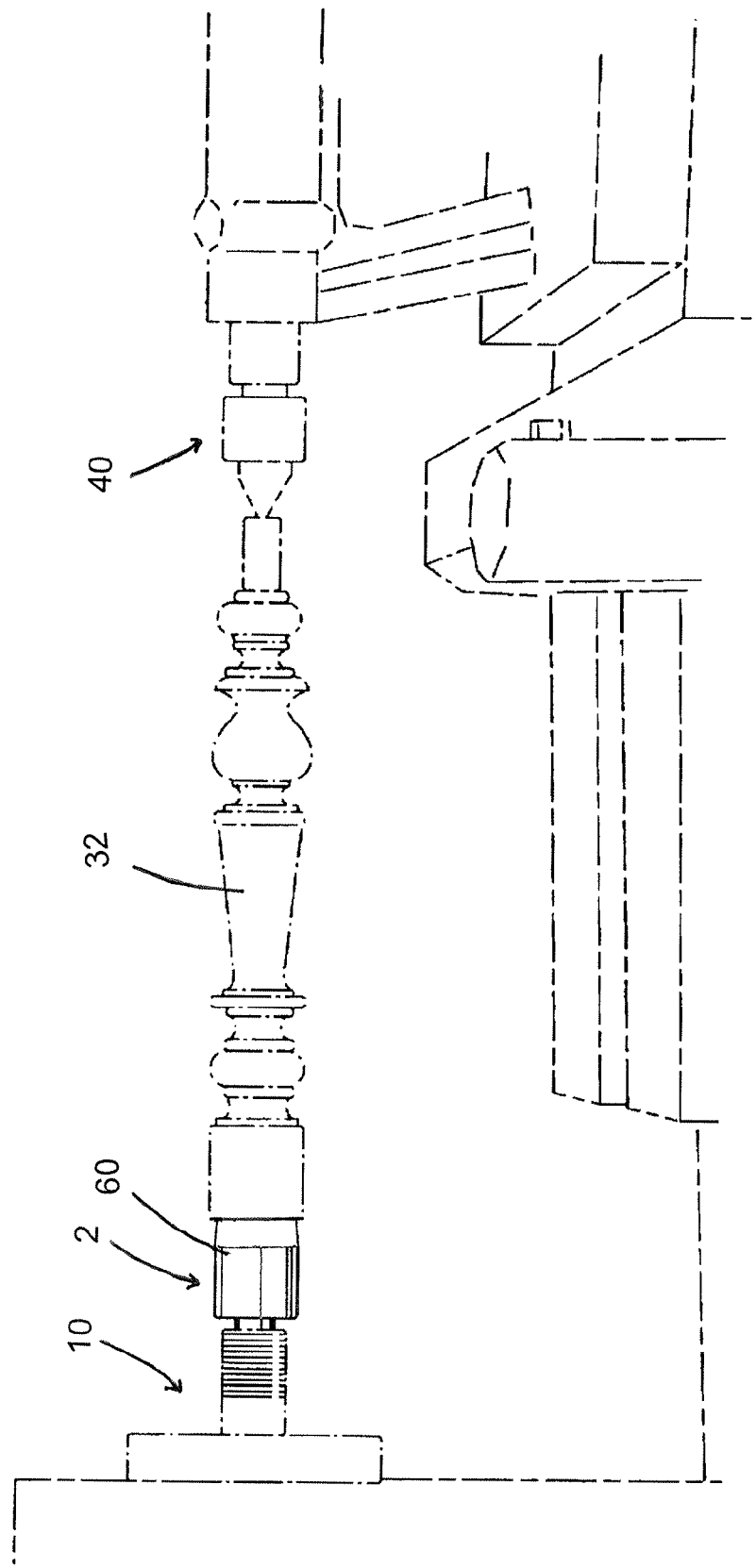
FIG. 16 is a diagrammatic side view of the drive center installed on a lathe with the drive center being used to hold the workpiece

Turning now to FIGS. 1-9, the various components of the drive center 2, according to present invention, will now be briefly discussed. As can be seen, the drive center 2 comprises a body 4 that includes a shank 6 and head 8. The shank 6 is an elongate member that is tapered to fit into the tapered bore of the headstock spindle 10 of a lathe (FIG. 16). The head 8 of the body 4 comprises a plurality of apertures 56, 58, 67 and 20. Apertures 58 receive and support a number of spurs 12, e.g., typically four, a center point 14, a retaining pin 16, set screws 18 and adjusting screws 54 which are utilized to adjust and lock the position of these elements in the manner described below. The body 4 has a central bore 20 that extends along the length thereof and supports and aligns the center point 14, a spring 22, a spring pusher 24 and an adjustment screw 26 in the manner described below.

As best seen in FIGS. 2 and 11, the central bore 20 of the drive center 2 is oriented so as to be centrally located along the length of the body 4. The central bore 20 generally defines the rotational axis 28 of the drive center 2 due to the fact that the center point 14 is received within the central bore 20 at the head end of the drive center 2. It is to be appreciated that the center point 14, according to the invention, can be any desired axial length. The central bore 20 is cylindrically shaped over the entire length of the body 4 and has a diameter, at least in the head 8 of the drive center 2, which closely matches, but is slightly larger than, the outer diameter of the center point 14. Due to this arrangement, the center point 14 is tightly and snugly received by the head 8 within the central bore 20. It is to be appreciated that the fit between the head 8, of the drive center 2, and the center point 14 must be loose enough so as to allow relatively free axial movement of the center point 14 along the rotational axis 28 but, at the same time, be sufficiently tight so as to prevent lateral movement of the center point 14 in relation to the rotational axis 28. In other words, the center point 14 must be capable of moving axially in the central bore 20, but is retained therein such that the point 30 of the center point 14 is always located along and coincident with the rotational axis 28. If the need arises for the workpiece 32, FIG. 16, to be removed from the lathe, this tight fit enables the point 30 of the center point 14 to be repeatedly located on the rotational axis 28 of the drive center 2. This is vital for proper re-centering of the workpiece 32.

The diameter of the central bore 20 is substantially the same over a majority of the length of the drive center 2. However, at the remote end 34 of the shank 6, the central bore 20 has a narrow portion 36 with a reduced diameter. The narrow portion 36 of the central bore 20 is also threaded and receives and matingly engages with a threaded adjustment screw 26, the purpose of which will be discussed below. In addition to receiving the threaded adjustment screw 26, the narrow portion 36 of the central bore 20 also receives a trailing end of a spring pusher 24 which functions, in combination with the threaded adjustment screw 26 and the spring 22, to adjust the tension applied to the center point 14 by the spring 22.

The spring 22 is arranged within the central bore 20 between a trailing end of the center point 14 and a leading end of the spring pusher 24. The spring 22 communicates with a trailing end 38 of the center point 14 and applies a spring force which pushes the center point 14 in a direction projecting out of the head 8 and away from the spurs 12. The adjustment screw 26/spring pusher 24/spring 22 arrangement enable adjustment of the force imparted by the center point 14 against the workpiece. Further, due to the ability of the center point 14 to move along the rotational axis 28 in combination with the ability of the spring 22 to compress, it is possible to remove the workpiece 32 from the drive center 2 without being required to stop the rotation of the lathe spindle and the drive center 2.

According to the prior art, when the turner wants to remove the workpiece 32 from the lathe, he/she typically turns the lathe off and waits for the workpiece 32, which is still engaged with the spurs 12, to stop rotating. Once the workpiece 32 stops rotating, the tailstock 40 is then retracted or backed off so as to axially separate the drive center 2 from the workpiece 32. However, with the drive center 2 according to the invention, once the tailstock 40 is sufficiently retracted, the spring force placed on the center point 14 by the spring 22 axially pushes the workpiece 32 away from the drive center 2 such that the spurs 12 disengage from the workpiece 32. At the same time, however, the workpiece 32 is still supported and centered by the center point 14. Since the center point 14 only transmits minimal rotational force, if any, to the workpiece 32, the workpiece 32 can be readily stopped and removed from the lathe by further withdrawal or retraction of the tailstock 40 without stopping the lathe.

The adjustment screw 26/spring pusher 24/spring 22 arrangement of the drive center 2, according to the invention, enables the force exerted by the center point 14 on the face of the workpiece 32 to be adjusted. The spring force applied on the center point 14 by the spring 22 is adjustable via adjustment of the spring pusher 24 which is arranged within the central bore 20. The spring pusher 24, as shown in FIGS. 4 and 11, comprises a stem 42 and a disk 44 and is aligned within the central bore 20 with the stem 42 extending toward the trailing remote end 34 of the shank 6 and the disk 44 facing toward the head 8 of the drive center 2. The stem 42 of the spring pusher 24 is received within and slidably mates with the narrow portion 36 of the central bore 20, while the disk 44, on the other hand, has a diameter that is at least slightly smaller than the diameter of the wider portion 46, FIG. 2, of the central bore 20. Communication between the stem 42 of the spring pusher 24 and the narrow portion 36 of the central bore 20 facilitates axial alignment of the spring pusher 24 within the central bore 20 while, at the same time, permitting the spring pusher 24 to slide along the central bore 20 and coincident with the rotational axis 28 of the drive center 2.

The spring pusher 24 is arranged within the central bore 20 such that the disk 44 communicates with the trailing end of spring 22 opposite from the center point 14. As briefly discussed above, the leading end of the spring 22 contacts the center point 14 such that the spring 22, located between the spring pusher 24 and the center point 14, exerts a constant and continuous spring force on the center point 14 so as to axially bias the center point 14 out of the head 8. The spring force exerted by the spring 22 on the center point 14 is adjustable by rotating the threaded adjustment screw 26. That is, rotation of the adjustment screw 26 further into the narrow portion 36 of the central bore 20 causes the spring pusher 24 to gradually move toward the head 8 which compresses the spring 22 so that the spring 22 exerts a greater spring force on the center point 14. In contrast, rotation of the adjustment screw 26 out of the narrow portion 36 of the central bore 20 causes the spring pusher 24 to gradually move away from the head 8 which permits expansion of the spring 22 so that the spring 22 exerts a smaller spring force on the center point 14. This induces a reduction of the spring force applied by the spring 22 on the center point 14.

As is known, the type of material of the workpiece often correlates to the amount of force of the center point required to effectively position the workpiece. Typically, a greater force is preferred when turning a heavy workpiece. For light or thin workpieces, or other material with similar characteristics, a light force is generally preferred. In view of the above, it should be apparent that due to the ability to adjust, via the adjustment screw 26, the amount of spring force applied to the center point by the spring 22, the drive center 2 according to the invention can be utilized with workpieces having a wide range of weight. That is to say, the pressure applied by the center point 14 on the workpiece 32 can be adjusted according to the individual characteristics of the workpiece 32.

The spring-loaded center point 14 comprises a milled slot 48 which passes laterally through the center point 14 and the milled slot 48 extends along the rotational axis 28 of the center point 14 so as to retain as well as limit the range of axial movement of the center point 14. A retaining pin 16, as seen in FIGS. 1 and 11, is frictionally accommodated and retained within a pin passage 67 which is located within the head 8. The pin passage 67 extends through the head 8 normal to and coincident with the central bore 20. The retaining pin 16, when located within the pin passage 67, passes through the milled slot 48 so as to thereby captively retain and limit to and fro axial movement of the center point 14, and also prevent relative rotation of the center point 14 as described previously. Axial movement of the center point 14 is thereby limited to the axial length of the milled slot 48 minus the diameter of the retaining pin 16. The point 30 of the center point 14 has an included angle of precisely 60 degrees.

Figure 5:
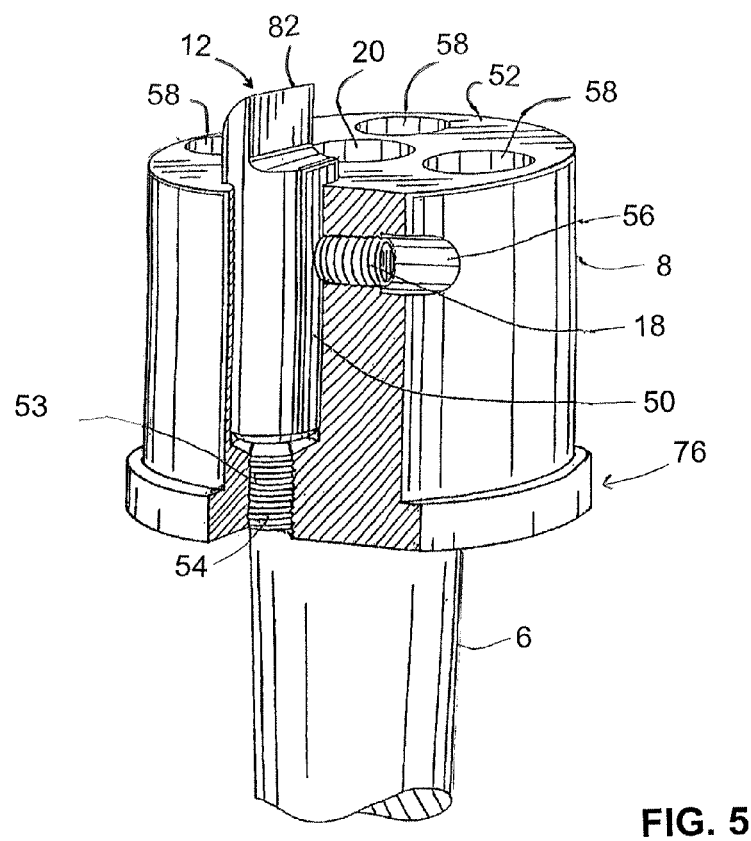
FIG. 5 is an isometric view of the head of the drive center prior to the installation of the guard according to the invention showing a spur arranged within a bore in the head.

As best seen in FIGS. 5 and 10, the head 8 of the body 4 supports a plurality of spurs 12, e.g., typically four, also commonly referred to as driving dogs, prongs, or driving members. These spurs 12 radially surround the center point 14. Each of these spurs 12 has a flat 50 that is machined longitudinally along the spur 12 and the respective flat 50 matingly engages with a tangentially arranged set screw 18 so as to lock the spur 12 in its adjusted position once the height of the spur 12, projection above the face 52 of the head 8, has been adjusted via suitable adjustment of the push screw 54. As the features of the spurs 12 are generally known in the art, a further detailed discussion concerning the spurs 12 will not be provided herein.

As noted, the amount that each spur 12 projects beyond the face 52 of the head 8 is individually adjustable by the respective push screw 54, once the associated set screw 18 is sufficiently loosened. This allows precise setting of the height of each one of the spurs 12 so that all of the spurs 12 can typically project the same distance from the face 52 of the head 8. In a like manner, the spurs 12 can be individually adjusted if the face of the workpiece 32 is at an angle with respect to the face 52 of the head 8. In order to adjust the distance by which the spurs 12 project out from the head 8, the set screw 18 is first sufficiently rotated out of the set screw bore 56 so as to break contact with the flat 50 of the spur 12 and thereby permit relative movement. Such disengagement from the set screw 18 frees the spur 12 such that the spur 12 can slide along its axis within the spur bore 58. One end of the spur bore 58, opposite from the face 52 of the head 8, has a narrow threaded portion 53 which receives the push screw 54. As the push screw 54 is rotated either into or out of the narrow threaded portion 53 of the spur bore 58, such movement induces the respective spur 12 to move correspondingly axially along the spur bore 58. The distance by which the spur 12 projects out of the head 8 is thereby adjusted by a corresponding adjustment of the push screw 54. Once the spur 12 is adjusted to its desired height, the set screw 18 is then retightened so as to engage the flat 50 and lock the spur 12 in the adjusted position. Although the figures show the drive center 2 as having four spurs 12, it is to be understood that the drive center 2 may also be utilized with only two spurs 12, for example, by removing the two excess spurs 12. It is to be appreciated that a drive center comprising a different number of spurs, e.g., three, six, etc., are also foreseeable. The spurs 12 of the drive center 2 according to the invention are thus able to be readily removed for resharpening or replacement if desired or necessary.

As shown in FIGS. 8-11, the drive center 2 has a guard 60 which intimately and closely surrounds the circumference of the head 8 and is normally spring loaded into an extended position which encircles and encloses the face 52 of the head 8 and the spurs 12 protruding therefrom. The guard 60 is secured to the head 8 in the manner illustrated in FIG. 11 such that the head 8 is substantially enclosed by the spring loaded guard 60. The guard 60 is generally cylindrical in shape and has an inwardly facing surface that includes a cylindrical slide portion 64 that mates with and slides along a cylindrical exterior surface 66, FIG. 2, of the head 8. A trailing end inner surface of the guard 60 comprises a wider portion 68 which has a larger diameter than a diameter of the slide portion 64. The slide portion 64 of the guard 60 has a diameter that is substantially equivalent or only slightly larger than a diameter of the exterior surface of the head 8, e.g., by a few thousands of an inch or so, so as to permit relative sliding movement therebetween. The sliding surface 64 has a sufficiently axial length so as to maintain a concentric arrangement of the guard 60 with respect to the head 8 as the guard 60 slides axially along the exterior surface 66 of the head 8. As shown in FIG. 9 for example, since the diameter of the wider portion 68 of the inner surface of the guard 60 is greater than the diameter of the sliding surface 64, this recessed region thus forms an internal cavity 70, FIG. 11, between the wider portion 68 and the exterior surface 66 of the head 8. The transition of the diameters, from the slide portion 64 to the wider portion 68 of the inner surface 62, form an abutment shoulder 72, the purpose of which is described below. An annular groove 74 is formed in the trailing end of the guard 60 adjacent the trailing end of the wide portion 68 which is located closest to the shank 6, and the purpose of the annular groove 74 will be described below.

As shown in FIG. 1, the head 8 has a flange 76 that is located at a trailing end of the head 8, adjacent the shank 6. The flange 76 extends radially outwardly from the exterior surface 66 of the head 8 by a distance that is slightly less than the diameter of the wide portion 68 of the inner surface 62 of the guard 60. An outwardly facing cylindrical surface of the flange 76 mates with and is slidable relative to the wide portion 68 of the inner surface 62 of the guard 60 so as to help maintain the concentric arrangement of the guard 60 with respect to the head 8 as the guard 60 slides to and fro axially along the exterior surface 66 of the head 8, as described below in further detail.

Figure 15:
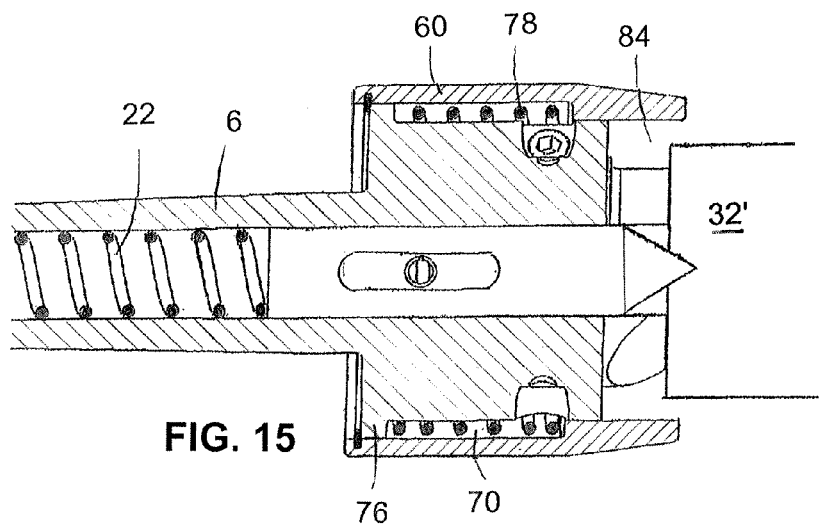
FIG. 15 is a partial diagrammatic cross sectional view of the drive center of FIG. 10 showing initial engagement of the spurs with a workpiece having a diameter smaller than the workpiece illustrated in FIGS. 12-14.
Figure 12:
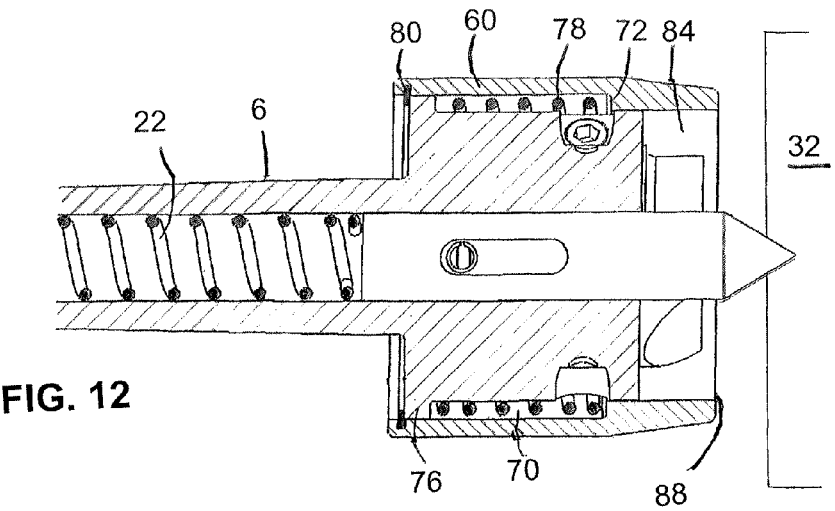
FIG. 12 is a partial diagrammatic cross sectional view of the drive center of FIG. 10 with a workpiece being located on the center point.

A spring 78 is accommodated within the internal cavity 70 and a first end thereof abuts against the flange 76 while an opposite end thereof abuts against the abutment 72 of the guard 60 so as to normally spring load and bias the guard 60 into its fully extended position, as generally shown in FIGS. 11, 12 and 15, for example. That is, the spring 78 biases the guard 60 in an axial direction away from the flange 76 so that a leading end of the guard 60 extends beyond the leading end of the spurs 82. A retainer 80, such as retainer ring or a circlip, is located within the annular groove 74 of the guard 60 and the retainer 80, in the extended position of the guard 60, abuts against the flange 76 so as to prevent further axial movement of the guard 60 toward the leading end of the head 8. It is to be appreciated any type of retainer can be utilized to limit excess movement of the guard 60 so long as the retainer can be secured to and removed from the guard 60. This enables easy installation or removal of the guard 60 from the head 8.

In order to install the guard 60 on the head 8, the spring 78 is first slid over the head 8 so that one end thereof engages with the flange 76. Next, the guard 60 is slid over the head 8, trailing end first, so that the abutment 72 engages with the opposite end of the spring 78. The guard 60 is further moved toward the shank 6 against the force of the spring 78 until the annular groove 74, located in the trailing end, is accessible. Thereafter, the retainer 80 is secured within the annular groove 74 of the guard 60 and the guard 60 can then be released so that the retainer 80 then abuts against the flange 76 and captively retains the guard 60 on the head 8.

The guard 60 has an axial length such that when the retainer 80 abuts against the flange 76 the guard 60 is fully extended, as seen in FIG. 11, and extends axially beyond the face 52 of the head 8 and radially encloses and encases the engaging end 82 of the spurs 12. However, in the fully extended position, i.e, when no axial forces are exerted on the guard 60 to force the guard 60 toward the shank 6, the guard 60 still remains axially spaced from the point 30 of the center point 14 so that the point 30 is readily accessible. That is, the guard 60 does not surround or encase the center point 14 which always protrudes and projects from the space 84 enclosed and encased by the guard 60.

To emphasize the benefits of the inventive drive center 2, the process of mounting or remounting the workpiece 32 while the lathe is operating and the drive center 2 rotating will be now described with reference to FIGS. 11-15. For the sake of clarity, the process will only be described with regard to mounting the end of the workpiece 32 that is to be supported by the drive center 2. As generally shown in these figures, the workpiece 32 is initially mounted, in a conventional manner, so that a first end of the workpiece 32 is positioned against the point 30 of the center point 14 while a second end of the workpiece 32 is supported by the tailstock 40, in the absence of external forces, e.g., see FIG. 11 where the center point 14 and the guard 60 are both generally shown in an extended position relative to the head 8.

With regard to the center point 14, the center point 14 is fully extended when the retaining pin 16 abuts the axial end 86 of the milled slot 48 opposite the point 30. As indicated above, the center point 14 is spring loaded into this position by force applied by the spring 22. The guard 60 is considered to be in its fully extended position (FIGS. 11, 12) when the retainer 80 abuts against the flange 76. In this position, the guard 60 radially encloses the spurs 12 and generally prevents, or at least significantly reduces, the possibility of an object(s), e.g., hair, loose clothing and cutting tools contacting or becoming entangled with the spurs 12, while the drive center 2 is rotating. To facilitate centering of the workpiece 32, the center point 14 extends beyond the leading surface 88 of the guard 60 to facilitate centering engagement with the workpiece 32. This enables the turner to see the center point 14 and properly align the center point 14 with the rotational center of the workpiece 32, e.g., an indentation previously formed into the end face of the workpiece 32.

A workpiece 32 is considered to be "located" when it is supported by both the head and tail centers of the lathe. A "located" workpiece 32 is illustrated in FIG. 12 in which the center point 14 is sufficiently introduced into the workpiece 32 to center the workpiece along the rotational axis of the lathe, but the workpiece 32 has not yet engaged with either the guard 60 or the spurs 12. It is noted that in this position, although the center point 14 supports the workpiece 32 and the center point 14 is rotating, the rotation of the center point 14 is insufficient to induce rotation to the workpiece 32.

While maintaining proper alignment of the center point 14 and the workpiece 32, the tailstock 40 is then gradually adjusted, in a conventional manner, so as to move the workpiece 32 gradually axially along the rotational axis of the lathe toward the drive center 2. As soon as the center point 14 is fully located within the indentation provided within the workpiece 32, further axial adjustment of the tailstock 40, toward the drive center 2, thereby causes the center point 14 to be axially retracted within the head 8, against the force of the spring 22.

After centering the workpiece 32, the tailstock 40 continues to be further gradually advanced toward the headstock supporting the drive center 2 which, in turn, forces the center point 14 to be retracted further into the head 8 of the drive center 2. The degree to which the center point 14 is inserted into the workpiece 32 and the amount the tailstock 40 needs to be further advanced and adjusted so as to secure the workpiece 32 depends at least on the type of material comprising the workpiece 32 and the spring force applied to the center point 14 by the spring 22.

Figure 13:
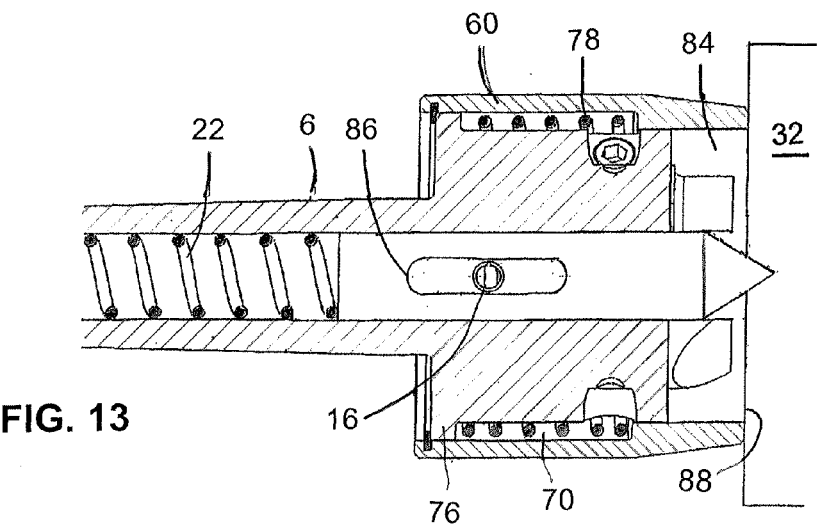
FIG. 13 is a partial diagrammatic cross sectional view of the drive center of FIG. 10 showing initial engagement of the guard with the workpiece.

Once the center point 14 is sufficiently retracted into the head 8 by the distance which it initially extended beyond the guard 60, the leading circumferential surface 88 of the guard 60 commences engagement with the surface of workpiece 32, as generally illustrated in FIG. 13. Once the guard 60 abuts against the surface of the workpiece 32, the spurs 12 are completely enclosed by and within the guard 60 thereby preventing an object(s), e.g., hair, loose clothing, and cutting tools, from inadvertently contacting or becoming entangled with the spurs 12.

Figure 14:
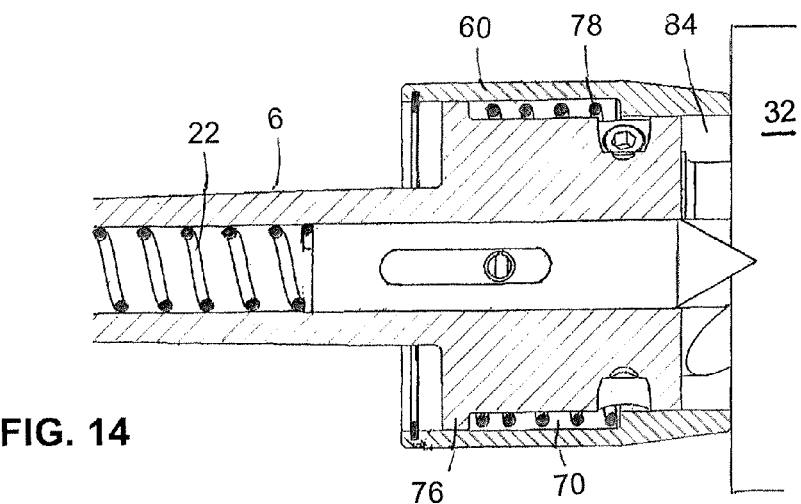
FIG. 14 is a partial diagrammatic cross sectional view of the drive center of FIG. 10 showing initial engagement of the spurs with the workpiece.

In addition to the enhanced safety aspects, the spring loaded guard 60 also functions as a synchronizer for assisting with engagement between the drive center 2 and the workpiece 32. In the process of mounting the workpiece 32, while the lathe spindle 10 and thus the drive center 2 are rotating, the workpiece 32 is, at first, located between the point 30 of the center point 14 and the tailstock center 40, and initially the workpiece 32 is at least substantially stationary as shown in FIG. 12. With drive centers known in the prior art, the tailstock center 40 is next advanced so as to engage the workpiece with the spurs, however, if the tailstock center 40 is advanced too rapidly toward the drive center, such sudden engagement of the spurs with the workpiece 32 can possibly cause the center point to move away from its proper centered location with the workpiece 32. This happens especially if the end surface of the workpiece 32 is not "square" to the rotational axis, or the spring force on the center point is not correctly adjusted, via adjustment screw 26, so as to be commensurate with the weight of the workpiece 32. This problem is overcome with the inventive drive center 2 by the fact that a limited amount of rotation can be imparted to the workpiece 32 as soon as the guard 60 engages with the workpiece 32, as generally shown in FIG. 13, prior to the engagement of the workpiece 32 with the spurs 12 as generally shown in FIG. 14.

Due to frictional connection of the guard 60 with both the spring 78 and the exterior surface of the head 8, the guard 60 normally rotates along with the head 8. Although the guard 60 is not strictly fixed rotationally connected to the head 8, the guard 60 can transmit limited rotational forces to the workpiece 32. The amount of rotation imparted by the guard 60 to the workpiece 32 depends on the amount of frictional forces between the engaged surfaces of the guard 60 and the workpiece 32 as well as the radius of the guard. For example, a very small workpiece 32', as shown in FIG. 15 for example, that fits completely inside the guard 60, would not benefit from the synchronization feature described above. Since the guard 60 is normally able to initially impart a limited amount of rotation to the workpiece 32, before the spurs 12 eventually engage with the workpiece 32, the rotational speed difference, between the workpiece 32 and the spurs 12 when those components engage with one another, can be greatly reduced or possibly eliminated.

From the point at which the workpiece 32 contacts the leading surface 88 of the guard 60, continued adjustment of the tailstock 40 toward the drive center 2, gradually drives the workpiece 32 into engagement with the spurs 12 of the drive center 2. As soon as the surface of the workpiece 32 engages with the leading surface of the guard 60 (see FIG. 13), both the center point 14 and the guard 60 are sufficiently retracted axially backward in the direction of the shank 6 to an at least partially retracted position. The distance over which the center point 14 and the guard 60 travel, before the spurs 12 eventually engage with the surface of the workpiece 32, is the axial distance of which the guard 60 extends beyond the spurs 12 when the guard 60 is in its fully extended position. FIG. 14 illustrates a further retracted position at which the spurs 12 engage with the surface of the workpiece 32 and commence driving rotation of the workpiece 32. At this point, the workpiece 32 is rotationally driven by the drive center 2 at the rotational speed set by the turner, without any slip or speed difference, and the workpiece 32 is now ready to be turned, e.g., worked, turned, cut, sanded, etc., by the turner.

A further embodiment of the drive center 89 is illustrated in FIGS. 17-19. As this embodiment of the drive center 89 is substantially the same as the drive center 2 discussed above, only the differences between the two embodiments will be described below. As many of the features and elements of this further embodiment are identical to features and elements of the drive center discussed above, the elements that are common to both embodiments will be identified with the same reference numbers.

In this embodiment of the drive center 89 illustrated in FIGS. 17-19, the spurs 92 are integral with the head 91, for example the spurs 92 and the head 91 can be milled from one piece of material or it is conceivable that the spurs and the head milled independently and then permanently secured to each other. The drive center 89 comprises four spurs 92 that are integral with the head 91 and each spur 92 has a leading edge 94 that engages the workpiece 32 being turned. It should be appreciated that because the head 89 of this embodiment lacks the means for enabling adjustment and removal of the spurs 92, the manufacturing of such a drive center 89 having a head 91 with integral spurs 92 would simplified and therefore less expensive to manufacture. Specifically, in comparison to the prior discussed embodiment, this further embodiment does not include set screws 18 and push screws 54 and the associated bores 56, 58.

To further simplify the manufacturing of the drive center 89 and reduce the cost associated therewith, the drive center 89 can comprise a blind center bore 93, i.e., a blind bore that extends along the rotational axis 28 through the head 91 and through only a portion of the shank 6, as illustrated in FIGS. 17 and 19. Similar to the previously described embodiment, the center point 14 is spring loaded by a force applied by the spring 22. However in this embodiment, the trailing end of the spring 22 abuts the bottom 95 of the blind center bore 93. This embodiment eliminates the use of the spring pusher and the adjustment screw.

Although FIGS. 17-19 illustrate an embodiment comprising both the features of integral spurs 92 and a blind center bore 93, it is conceivable a drive center to comprise only one of these features, i.e., integral spurs or a blind center bore.

In the above description and appended drawings, it is to be appreciated that only the terms "consisting of" and "consisting only of" are to be construed in the limitative sense while of all other terms are to be construed as being open-ended and given the broadest possible meaning.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

We claim:

1. A drive center for use with a lathe comprising a headstock and a tailstock, the drive center comprising:
   a head having a leading face and an exterior surface, and the leading face of the head supporting a plurality of spurs and a center point;
   a shank being integrally connected with a trailing end of the head and having a remote end that is spaced from the head; and the center point, the shank and the head defining a rotational axis of the drive center;
   a cylindrical guard being coaxially supported by the exterior surface of the head such that the guard encases the head, and the guard being axially slidable along the exterior surface of the head between an extended position and a retracted position; and a spring being arranged around the head and biasing the guard into the extended position in which a leading portion of the guard projects past the leading face of the head and the spurs but not the center point, and the guard, when in the retracted position, encloses the spurs while still facilitating engagement between the spurs and a workpiece.

2. The drive center according to claim 1, wherein the head comprises a plurality of bores in the leading face thereof which receive the center point and at least two spurs, the center point and the at least two spurs axially projecting out of the leading face of the head so as to engage a workpiece.

3. The drive center according to claim 2, wherein the spring is supported between the head and the guard, and a force exerted by the spring slides the guard, in relation to the head, in an axial direction toward the leading face of the head to a position in which the guard radially encircles the at least two spurs.

4. The drive center according to claim 3, wherein the head and the shank comprise a central bore that extends from the leading face of the head to the remote end of the shank, the central bore defines the rotational axis of the drive center and slidably receives the center point, the center point having a tip end and a tail end, a spring pusher is located within the central bore adjacent the remote end of the shank, an adjustment screw is threadably received in the central bore at the remote end of the shank and abuts the spring pusher, a second spring is located within the central bore axially between the spring pusher and the tail end of the center point, the second spring is engagable with the spring pusher and the tail end of the center point so as to bias the center point in the axial direction toward the leading face of the head such that the tip end of the center point extends axially beyond the at least two spurs, and the adjustment screw is axially adjustable by rotation thereof so as to adjust an amount of axial force exerted on the center point by the second spring to facilitate mounting and removal of the workpiece.

5. The drive center according to claim 4, wherein the center point has a milled slot and the head comprises a diametral bore which removably receives a pin such that the pin passes through the milled slot in the center point to limit axial movement of the center point along the rotational axis of the drive center, and rotationally fixes the center point therein.

6. The drive center according to claim 4, wherein the plurality of bores are through bores that extend axially completely through the head, the through bores have a tail end that is remote from the leading face of the head, the tail end of the through bores threadably receive a push screw, the push screws engage the at least two spurs such that rotation of the push screws adjust an axial distance by which the at least two spurs extend beyond the leading face of the head.

7. The drive center according to claim 2, wherein the spring contacts an inner surface of the guard and the exterior surface of the head and exerts a continuous force therebetween to axially slide the guard away from the remote end of the shank toward the leading face of the head, the exterior surface of the head slidably supports the inner surface of the guard, the inner surface of the guard seats a removable retainer which contacts a flange on the head to limit axial sliding of the guard with respect to the head in an axial direction toward the leading face of the head.

8. The drive center according to claim 2, wherein the spring is supported between the head and the guard, and biases the guard, in relation to the head, in an axial direction toward the leading face of the head to a position in which the guard radially encircles the at least two spurs and the center point.

9. The drive center according to claim 2, wherein the guard is axially slidable with respect to the head in a direction toward the leading face of the head to a fully extended position in which a retainer that is seated in the guard contacts a flange on the head, and the guard in the fully extended position extends axially beyond and radially encircles the leading face of the head, the at least two spurs and the center point.

10. The drive center according to claim 2, wherein the head has a flange located at an end of the head adjacent the shank, the flange radially extending from the external surface of the head, the guard has a cylindrical inner surface comprising first and second cylindrical portions, the first cylindrical portion having a diameter that is greater than the second cylindrical portion, a shoulder connects the first and the second cylindrical portions of the inner surface of the guard, the first cylindrical portion being located closer to the remote end of the shank than the second cylindrical portion, the first cylindrical portion of the guard is directly supported by the flange and the second cylindrical portion of the guard is directly supported by the exterior surface of the head such that a gap is formed radially between the head and the guard and axially between the flange and the shoulder, the spring is arranged within the gap and abuts the flange and the shoulder to bias the guard in a forward axial direction toward the leading face of the head to a fully extended position in which the guard axially extends beyond and radially encircles the at least two spurs.

11. The drive center according to claim 10, wherein the first cylindrical portion of the inner surface of the guard has an annular groove axially located adjacent the shaft, the annular groove receives a removable retainer that abuts the flange to limit axial movement of the guard in the forward axial direction, with the guard in the fully extended position, the retainer abuts the flange, and the second cylindrical portion of the inner surface of the guard radially encircles the at least two spurs.

12. A drive center for use with a lathe having a headstock and a tailstock, the drive center comprising:

a head having a leading face and an external surface having a flange located at an axial end of the head opposite from the leading face, the head supporting a center point and at least two spurs which extend axially beyond the leading face of the head;

a shank being fixed to a trailing end of the head that is axially opposite the leading face of the head, the shank and the head defining a rotational axis of the drive center;

a cylindrical guard being coaxially supported by the external surface of the head such that the guard radially encircles the head, the guard having a cylindrical inner surface that is directly supported on the external surface of the head and the flange such that the guard is axially movable with respect to the head, the flange axially engages a retainer that is seated in the guard to limit axial movement of the guard with respect to the head, the guard being in a fully extended position when the flange engages the retainer;

a first spring being radially located between the inner surface of the guard and the external surface of the head, the first spring contacting the flange and the guard so as to continually bias the guard axially toward the fully extended position in which the guard extends axially beyond the leading face of the head and the at least two spurs.

13. The drive center according to claim 12, wherein the inner surface of the guard has an annular groove which receives the retainer, the retainer abuts the flange to stop axial movement of the guard with respect to the head and retain the guard in the fully extended position.

14. The drive center according to claim 12, wherein the inner surface of the guard has a first and second portion, the first portion of the guard has a diameter that is greater than a diameter of the second portion, a shoulder connects the first and the second portions of the inner surface of the guard, the first portion of the guard is supported by the flange and the second cylindrical portion of the guard is supported by the external surface of the head such that a gap is formed radially between the external surface of the head and the inner surface of the guard and axially between the flange and the shoulder, the first spring is arranged within the gap and abuts the flange and the shoulder to bias the guard in a forward axial direction toward the leading face of the head to the fully extended position in which the guard axially extends beyond and radially encircles the at least two spurs.

15. The drive center according to claim 12, wherein the head and the shank comprise a central bore that extends from the leading face of the head to the remote end of the shank, the central bore defines the rotational axis of the drive center and slidably receives the center point, the center point having a tip end and a tail end, a pusher is located within the central bore adjacent the remote end of the shank, an adjustment screw is threadably received in the central bore at the remote end of the shank and abuts the pusher, a second spring is located within the central bore axially between the pusher and the tail end of the center point, the second spring is engagable with the pusher and the tail end of the center point so as to bias the center point in an axial direction toward the leading face of the head such that the tip end of the center point extends axially beyond the at least two spurs, and the adjustment screw is axially adjustable by rotation thereof so as to adjust an amount of axial force exerted on the center point by the second spring to adjust the force commensurate with the weight, diameter, and rigidity of the workpiece.

16. The drive center according to claim 15, wherein the center point has a milled slot and the head comprises a diametral bore which removably receives a pin such that the pin passes through the milled slot in the center point to limit axial movement of the center point within the central bore, and rotationally fixes the center point therein with respect to the head.

17. A drive center for use with a lathe having a headstock and a tailstock, the drive center comprising:
a cylindrical head having a leading face, a trailing end and an external surface, a flange radially extending from the external surface at the trailing end of the head, the head having a plurality of bores which receive and support a center point and at least two spurs such that the center point and the at least two spurs extend axially beyond the leading face of the head;
a shank being connected to the trailing end of the head and having an axially opposite remote end, the shank and the head defining a rotational axis of the drive center;
a cylindrical guard being coaxially supported by the external surface of the head such that the guard radially encircles the head, the guard having a radially inner surface that extends axially from a leading surface of the guard to a tail end of the guard, the inner surface comprising a sliding surface and a trailing surface that has greater diameter than the sliding surface such that a shoulder is formed therebetween, the trailing surface having an annular groove located adjacent the tail end of the guard, the sliding surface contacts the external surface of the head and the flange contacts the trailing surface of the guard such that the guard is axially slidable along the rotational axis with respect to the head, an annular gap being formed axially between the flange and the shoulder of the inner surface of the guard;
a retaining ring being received within the annular groove, the flange of the head abuts the retaining ring to limit axial sliding of the guard in a forward direction toward the leading face of the head; and
a first spring being located within the gap and abutting the flange and the shoulder of the inner surface of the guard, the first spring exerting a force on the guard in the forward direction toward the leading face of the head, such that a portion of the guard extends axially beyond the leading face of the head and radially encircles the at least two spurs, the guard being axially slidable against the force of the first spring in a reverse direction toward the remote end of the shank.

18. The drive center according to claim 17, wherein the head and the shank comprise a central bore that is coaxial with the rotational axis of the drive center and extends from the leading face of the head to the remote end of the shank, the center point is received within the central bore and has a tip end and a tail end, a pusher is located within the central bore adjacent the remote end of the shank, an adjustment screw is threadably received in the central bore at the remote end of the shank and abuts the pusher, a second spring is located within the central bore axially between the pusher and the tail end of the center point, the second spring is engagable with the pusher and the tail end of the center point so as to bias the center point in an axial direction toward the leading face of the head such that the tip end of the center point extends axially beyond the at least two spurs, and the adjustment screw is axially adjustable by rotation thereof so as to adjust an amount of axial force exerted on the center point by the second spring to adjust the force commensurate with the weight, diameter, and rigidity of the workpiece.

19. The drive center according to claim 18, wherein the center point has a milled slot and the head comprises a diametral bore which removably receives a pin such that the pin passes through the milled slot in the center point to limit axial movement of the center point within the central bore, and rotationally fixes the center point therein with respect to the head.

* * * * *